Nov. 20, 1923.
A. MEISSNER
1,474,726
METHOD OF AND ARRANGEMENT FOR RECEIVING ELECTRICAL OSCILLATIONS
Filed Aug. 8, 1922
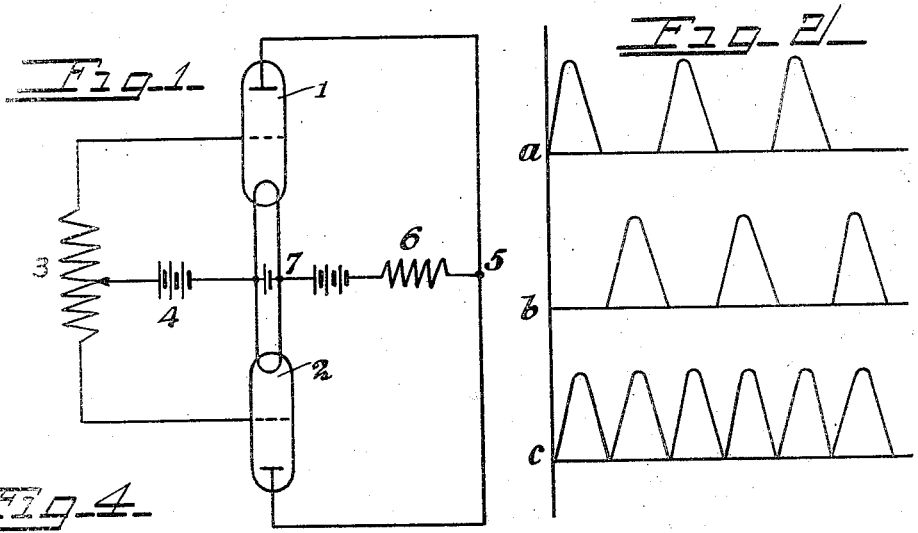
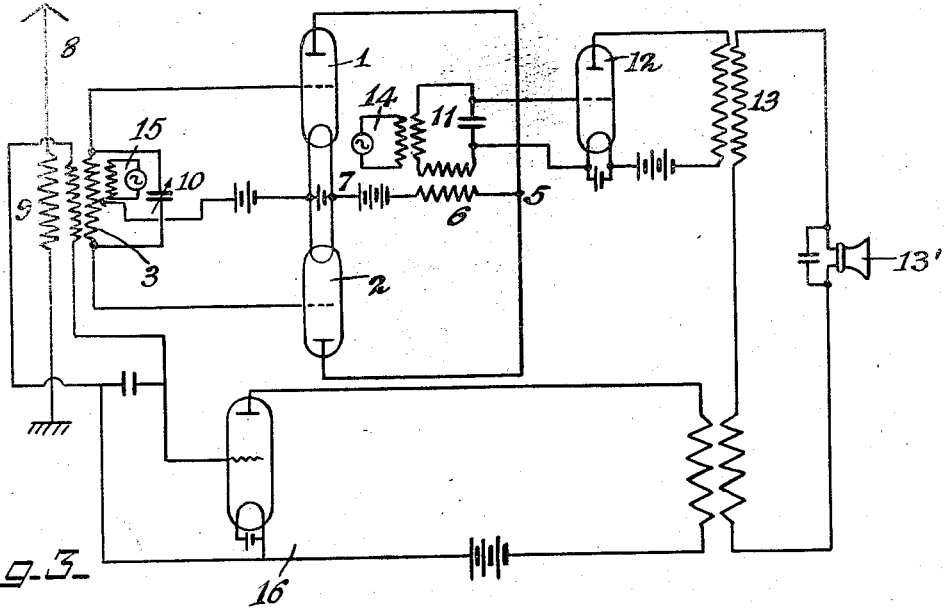
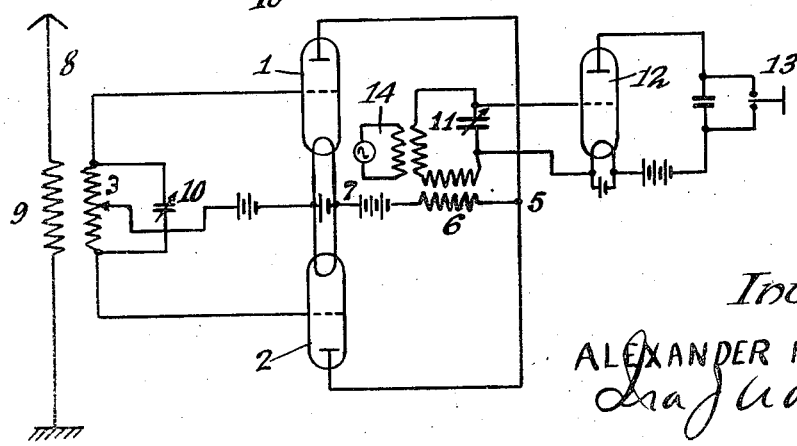
Inventor.
ALEXANDER MEISSNER Patented Nov. 20, 1923.

1,474,726

UNITED STATES PATENT OFFICE.

ALEXANDER MEISSNER, OF BERLIN, GERMANY, ASSIGNOR TO GESELLSCHAFT FÜR DRAHTLOSE TELEGRAPHIE M. B. H. HALLESCHES, OF BERLIN, GERMANY, A CORPORATION OF GERMANY.

METHOD OF AND ARRANGEMENT FOR RECEIVING ELECTRICAL OSCILLATIONS.

Application filed August 8, 1922. Serial No. 580,519.

*To all whom it may concern:*

Be it known that I, Dr. ALEXANDER MEISSNER, of German nationality, residing at 12/13, Hallesches Ufer, Berlin, Germany, have invented certain new and useful Improvements in and Relating to Methods of and Arrangement for Receiving Electrical Oscillations; and I do hereby declare the following to be a full, clear, and exact description of the invention, of which the following is a specification, and for which an application was filed in Germany May 27, 1921, No. G. 53,971.

The invention relates to a method of and arrangement for receiving electrical oscillations, by the use of which important advantages are obtained, especially in heterodyne reception of undamped oscillations. In accordance with an important feature of the invention, received energy, previous to the heterodyning, is passed through a device which increases its frequency. The increase of frequency may be obtained by such a transformation or distortion respectively of the received energy as to give rise to a harmonic of the basic frequency of such energy. For this purpose, for instance, coils having iron cores may be used with or without saturation. Other suitable means for increasing the frequency of the received energy include vacuum tube rectifiers; thus from the plate circuit of a vacuum tube relay current of a frequency greater than that of the current supplied to the relay may be taken. The received energy may be supplied directly to the frequency increasing means at the received high frequency, or a lower frequency derived from the received energy after any suitable transformation of such energy may be supplied to the frequency increasing means. It is essential, however, that in the receiving system as a whole the received energy is changed to a higher stage of frequency previous to the heterodyning.

The invention affords a particularly large degree of freedom from troubles, but its most important advantage is considered to be that it enables the number of senders operating simultaneously on a given scope of waves to be considerably increased. In the use of long distance stations, which generally use relatively long wave lengths, the number of senders which can be operated side by side is soon reached, since to every sender a certain scope of frequency is allotted which must also be available for receiving, in order that full use may be made of the transmitter energy. The scope of frequency of each sender must include 2500 oscillations both above and below its operating frequency, and to prevent interference, other senders must remain outside of these limits. The consequence of these facts is that within a range of wave lengths from 20,000 to 50,000 oscillations, for example, only from 6 to 10 senders can be operated side by side with heterodyne reception, if signals are to be received in an unobjectionable manner. When, however, in accordance with the present invention, the frequency of the received energy is increased previous to heterodyning, the interference prevention range of $\pm 2500$ cycles is to be taken into account with regard to the increased frequency, i. e., if, for instance, frequency of the received energy is quadrupled. Four times as many senders can be operated simultaneously side by side in the same scope of the received frequency without trouble in heterodyne reception.

The invention will be explained herein, by way of example, in connection with an arrangement in which the increase of frequency is effected by means of a vacuum tube rectifier.

Fig. 1 shows a frequency increasing device comprising two vacuum tubes; Fig. 2 shows curves explanatory of the action of the device shown in Fig. 1; Fig. 3 shows a receiving system in which the frequency of the received energy absorbed by the antenna is increased before it is transformed into useful energy; and Fig. 4 shows a modified form of receiving system enabling the elimination of disturbances by means of a compensating circuit.

Figure 1 of the drawing shows, for instance, a frequency increasing device comprising two vacuum tubes. Electrical oscillations are transmitted to the coil 3 by an antenna or other suitable source of energy, and the mid-point of the coil 3 is connected to the filaments of the tubes 1 and 2, the grid and plate circuits of which are arranged in parallel. The two tubes are preferably adjusted with a negative grid potential in such a manner that they operate at the lower bend of the tube characteristic, although, if desired, they may be adjusted to operate at the top bend. 4 is the grid battery. The tubes 1 and 2 furnish in their plate circuits, in consequence of the effect of the rectifier, currents of the kind represented at *a* and *b* respectively in Fig. 2. In the common portion of their plate circuits between the points 5 and 7, a current of the kind indicated at *c* is then generated, that is to say, a current of double the frequency of the received energy. By means of the coil 6, this current may then be delivered from the device.

Manifestly, several similar devices may be used in series in order to obtain a still greater increase of frequency. With such a device, a multiple increase of frequency can also be effected by again returning to the primary side of the device the energy of increased frequency taken from the coil 6. Also from one of such devices and without return conduction a higher harmonic of the received energy may be drawn if the heating of the filaments and the potential of the grids of the tubes are chosen in such a manner as to cause a higher harmonic to stand out stronger.

Fig. 3 shows an example of a receiving system for wireless telegraphy in which the frequency of the received energy absorbed by the antenna is increased before it is transformed into useful energy by means of further parts of the system. 8 denotes the antenna which is coupled by means of the coil 9 to the coil 3 of a vacuum tube device according to Fig. 1. The coil 3 together with the condenser 10 forms a secondary circuit syntonized to the frequency of the received energy. The energy of increased frequency is transmitted to the circuit 11 by the coil 6 and thence passed to the audion 12 which is connected to the telephone 13. The heterodyning in accordance with the invention may take place in the circuit 11 by an oscillator 14. The heterodyning of the increased frequency in the circuit 11 has the further advantage that outside disturbances due to the heterodyning energy are avoided since the heterodyning energy cannot be radiated.

Obviously, the feature of the invention which consists in increasing the frequency of the received energy and then heterodyning it can be carried out in connection with any desired device for the transformation of frequency. For example, the usual vacuum tube rectifiers can be used, but also for receiving purposes suitably dimensioned iron coils with or without direct current saturation may be employed for the distortion of the shape of the curve and the production of harmonic oscillations.

The arrangement described also enables the elimination of disturbances by means of a compensating circuit coupled to the receiving arrangement on opposite sides of the frequency increasing device, or by using two receiving circuits, each having a frequency increasing device, and connecting the two receiving circuits by way of a compensating connection. The disturbances will then wholly or partially neutralize each other. The energy which it is desired to receive will, however not be neutralized since transformation takes place in the two circuits in a different manner. In the use of the arrangement shown in Fig. 4, heterodyning is effected in the circuit 3, 10 by an oscillator 15 and simultaneously in the circuit 11 by the oscillator 14. For example, as a result of the first heterodyning, a tone 500 and by the second one a tone 1000 may be obtained. The result by reason of the provision of the compensating circuit 16 is the production of a mixed tone in the common indicator 13'. If in such an arrangement, heterodyning is effected in the circuit 11 only, the disturbances may be wholly or partially neutralized but instead of the mixed tone, a pure tone is obtained.

Amongst the manifold possibilities of utilizing the invention there is the possibility of receiving simultaneously waves of various lengths, for instance, by coupling several receiving circuits syntonized to various harmonics with the conduit in which the increased frequency occurs.

Furthermore all combinations of the most varying receiving means and selecting means with an increase of frequency at any point within the series of the receiving transformations come within the scope of the invention.

I claim as my invention:

1. A method of receiving electrical oscillations which consists in increasing the frequency of the received oscillations, heterodyning the increased frequency to form a beat frequency, and detecting the beat frequency.

2. A method of receiving electrical oscillations which consists in producing a harmonic of the frequency of the oscillations desired to be received, heterodyning the harmonic to form a beat frequency, and detecting the beat frequency.

3. A method of receiving electrical oscillations which consists in increasing the frequency of the received oscillations, heterodyning the increased frequency to form a beat frequency, compensating disturbances of the oscillations desired to be received so as to cause the disturbances to neutralize each other, and detecting the beat frequency.

4. An arrangement for receiving electrical oscillations comprising means for increasing the frequency of the oscillations desired to be received, means for heterodyning the increased frequency to form a beat frequency, and means for detecting the beat frequency.

5. An arrangement for receiving electrical oscillations comprising a device, including vacuum tube rectifiers, for increasing the frequency of the received oscillations, means for heterodyning the increased frequency to form a beat frequency, and means for detecting the beat frequency.

6. An arrangement for receiving electrical oscillations comprising a device for producing a harmonic of the frequency of the received oscillations, said device including a plurality of vacuum tubes connected in parallel so that the rectified waves in the plate circuits of the tubes combine with each other to form a harmonic of the received oscillations, means for heterodyning the harmonic to form a beat frequency, and means for detecting the beat frequency.

7. An arrangement for receiving electrical oscillations comprising a device for increasing the frequency of the received oscillations, means for heterodyning the increased frequency to form a beat frequency, means for causing disturbances of the oscillations desired to be received to neutralize each other, and means for detecting the beat frequency.

8. An arrangement for receiving electrical oscillations comprising an antenna, a frequency increasing device having a tuned circuit arranged on its input side and coupled with the antenna, an oscillator coupled with said tuned circuit for producing a beat with the frequency of the received oscillations, an oscillator coupled with the output circuit of the frequency increasing device for heterodyning the increased frequency to form a beat frequency, a compensating circuit coupled with said tuned circuit, and with the output side of the frequency increasing device, and means for detecting the last-mentioned beat frequency.

9. An arrangement for receiving electrical oscillations comprising the combination with a receiving circuit including a frequency increasing device, means for heterodyning the increased frequency, and a detector circuit of a compensating circuit for disturbances, coupled to the receiving circuit in advance of the frequency increasing device and also coupled to the detector circuit.

In testimony whereof I have signed my name to this specification.

Dr. ALEXANDER MEISSNER.